Feb. 21, 1933.  P. MOHLER ET AL  1,898,591
AIR CONDITIONING APPARATUS
Filed Oct. 17, 1927    6 Sheets-Sheet 5

Inventors
Paul Mohler
Peter Frantz
By Gillson, Mann & Cox  Attys.

Feb. 21, 1933.                P. MOHLER ET AL                1,898,591
                           AIR CONDITIONING APPARATUS
                            Filed Oct. 17, 1927        6 Sheets-Sheet 6

Inventors:
Paul Mohler
Peter Frantz
By Gillson, Mann & Cox Attys.

Patented Feb. 21, 1933

1,898,591

UNITED STATES PATENT OFFICE

PAUL MOHLER, OF CHICAGO, AND PETER FRANTZ, OF STERLING, ILLINOIS, ASSIGNORS TO WATT MANUFACTURING COMPANY, A CORPORATION OF ILLINOIS

AIR CONDITIONING APPARATUS

Application filed October 17, 1927. Serial No. 226,545.

This invention relates to air coolers and purifiers and to a system of circulating air in an enclosure.

One of the objects of the invention is the provision of new and improved means for removing dust and other foreign matter from air supplied to buildings.

Another object of the invention is the provision of new and improved means for cooling, humidifying and simultaneously cleaning air supplied to buildings and the like.

A further object of the invention is the provision of a new and improved air conditioning device that is a self-contained unit, being so constructed that it may be moved from place to place without disassembling the device.

Another object of the invention is the provision of a new and improved system for supplying clean air to an enclosure or building and for circulating the air in said building, together with means for simultaneously removing the foul air therefrom.

Another object of the invention is the provision of a new and improved air conditioning device that is cheap to manufacture, simple in construction, easily assembled, efficient in operation, and that is not likely to get out of order.

Other and further objects and advantages of the invention will appear from the following description taken in connection with the accompanying drawings, in which

Fig. 14 is a transverse vertical section showing a modified form of construction;

The invention may be built into the building in which it is used, or it may be made as a separate unit which may be installed at any time.

In the form of the device selected to illustrate one embodiment of the invention, the device is disclosed as forming a complete structure which may be manufactured and sold as a unitary device.

Referring now to the drawings, the reference character 10 designates what is termed, for convenience, the casing or cabinet, comprising the side walls 11 and 12, which for convenience will be termed the back and front walls, respectively, end walls 13 and 14, top wall 15 and bottom wall 16.

Figure 2:
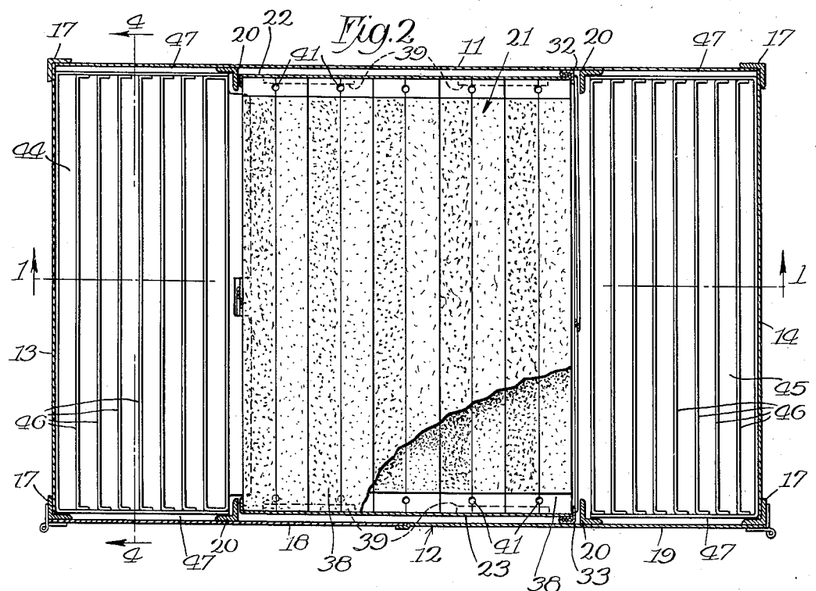
Fig. 2 is a horizontal section taken on line 2—2 of Fig. 1.
Figures 3, 6, 7, 8:
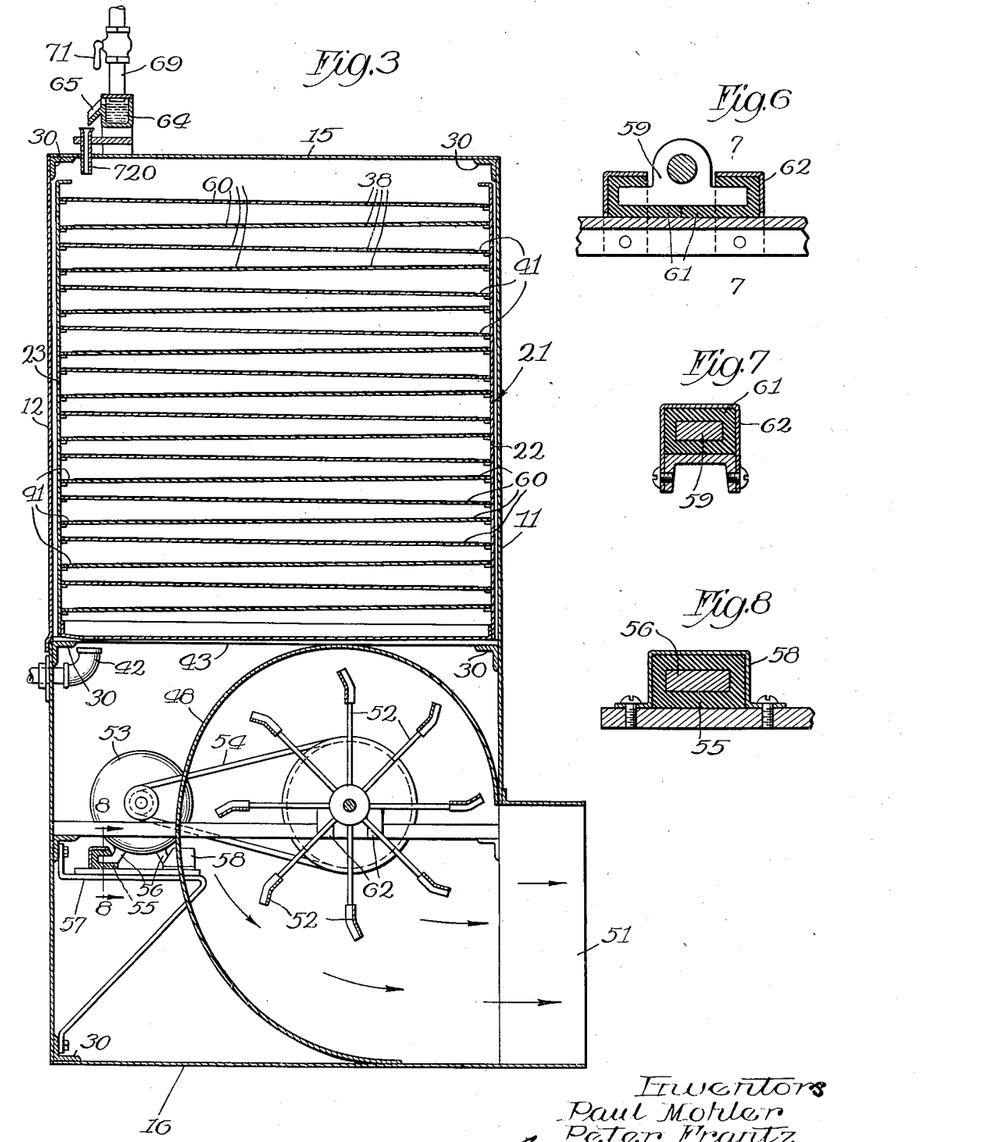
Fig. 3 is a transverse vertical section taken on line 3—3 of Fig. 1.
Fig. 6 is a section on line 6—6 of Fig. 1.
Fig. 7 is a section on line 7—7 of Fig. 6.
Fig. 8 is a section on line 8—8 of Fig. 3.
Figures 4, 5:
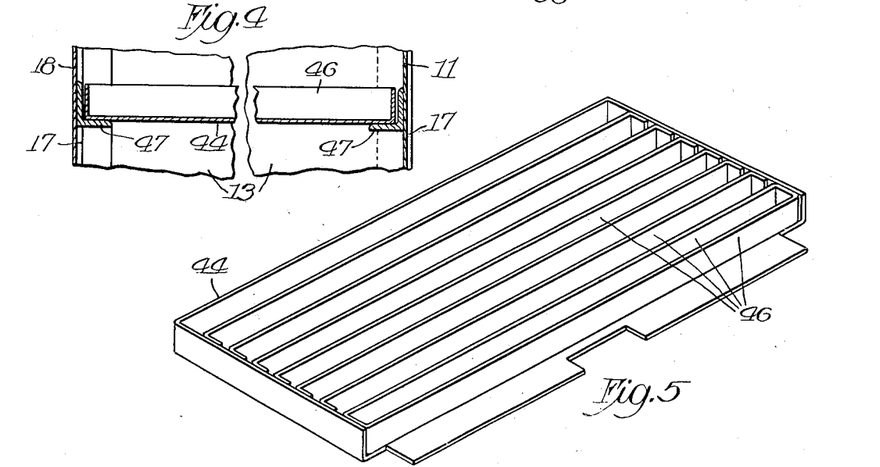
Fig. 4 is a section on line 4—4 of Fig. 2.
Fig. 5 is a perspective view of one of the baffle partitions.

Suitable frame members, such as the supporting bars or corner posts 17, the intermediate supporting bars 20, see Fig. 2, and the upper and lower horizontal strengthening bars 30, see Fig. 3, are employed to give rigidity to the cabinet and for strengthening and supporting the same.

Substantially all the mechanism except the water control and distributing device is mounted within the cabinet or casing 10. The latter are mounted on top of the cabinet. This makes a convenient arrangement for moving and installation. The parts may be all assembled at the factory and the device shipped as a unitary construction.

The front wall 12 is composed of the two doors 18 and 19 hinged to the front corner posts 17 as clearly indicated in Fig. 2 of the drawings. These doors permit the removal and insertion of the conditioning unit as will presently appear.

The air conditioning unit is designated generally by the reference character 21. It is preferably though not necessarily in sections. In the form of the device disclosed, the unit comprises the end plates or members 22 and 23, see Figs. 9, 10 and 11, which may be and preferably are of sheet metal having inwardly extending flanges 24 and 25, respectively, at their top and rear edges. The plates are connected together at their rear edge by suitable means as the brace rods 26 and 27 which are attached to the flanges 24. The front edges of the plates 22 and 23 are provided with return bends 28 and 29 which form vertical guides for the front member 31. The front member 31 comprises two vertical posts 32 and 33 angular in cross-section with their rearwardly extending flanges having return bends 34 and 35 for engaging the corresponding return bends 28 and 29 on the end members 22 and 23. The posts 32 and 33 are connected together by the diagonally extending wires 36 and 37 whereby the front member may be removed by sliding the same upwardly when it is desired to remove the partitions or baffles as will presently be described.

A plurality of partitions or baffle members or plates 38 are mounted in the unit 21. These baffles are preferably corrugated longitudinally thereof and are adapted to be slidably mounted within the unit 21. The baffles may be supported in any suitable manner. As shown, the end plates are slitted to form tongues which are bent inwardly to form brackets 39 for supporting the plates 38. The baffle plates are arranged with their alternate ends inclined downwardly and the lower ends of each are provided with openings 41 in the valleys of the corrugations whereby water supplied on the uppermost plate at its upper end will run down the plate, escaping through the holes onto the next plate below, which, being inclined in the opposite direction, will cause the water to flow in the opposite direction and escape onto the next plate below, and back and forth on the plates until it reaches the bottom plate from which it may escape into the sewer through the drain 42, see Fig. 3.

Figure 1:
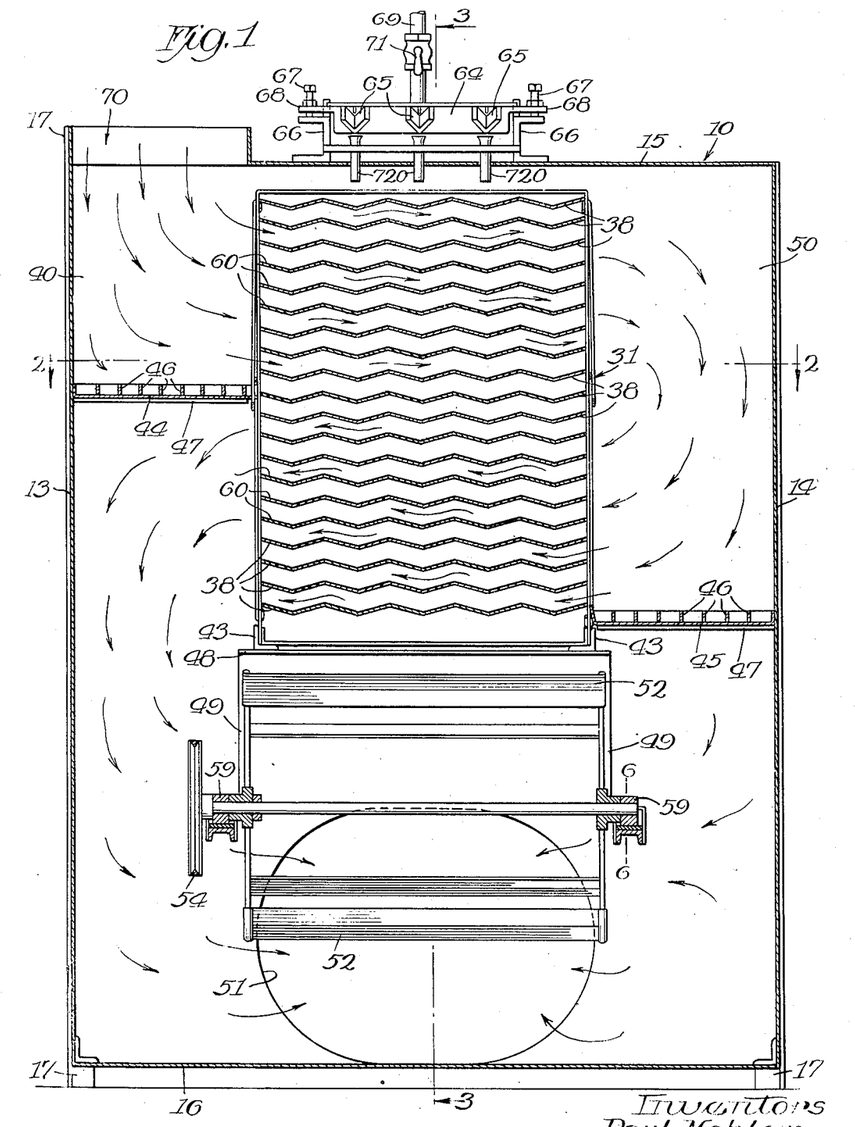
Fig. 1 is a longitudinal vertical section of the device taken on line 1—1 of Fig. 2.

The air conditioning unit is mounted in the cabinet in any suitable manner. As shown, it is supported on angle bars 43, see Fig. 1, extending transversely of the cabinet whereby when it is desired to remove the unit for cleaning or repairs, the same may be slid forwardly from the cabinet after the doors have been opened.

The unit 21 extends tranversely of the cabinet with the corrugations extending from front to back entirely across the same. The unit does not extend the full length of the cabinet. It is located intermediate between the ends whereby spaces 40 and 50 are formed at each side thereof. A partition 44 provided with vertical baffles is removably mounted in the space 40 and a partition 45 in the space 50.

Each partition is provided with upstanding baffles 46 for forming catch basins for catching dirt thrown against the same by the centrifugal action of the air passing through the cabinet. The partition 44 is removably mounted on brackets 47 intermediate between the upper and lower ends of the unit 21 in the space beneath the opening 70.

The partition 45 extends between the lower portion of the unit 21 and the side wall 14. By means of this arrangement air entering through the opening 70 is directed across the baffle plates of the unit into the space 50 between the unit and the wall 14 and back through said unit to the fan as will presently appear.

Suitable means are provided for causing the air to flow through the unit in one direction and back through the same in the opposite direction. In the form disclosed, which is by way of example only, a fan is employed for this purpose. The fan is preferably located in the lower portion of the cabinet and is surrounded by the scroll casing 48 having axial openings 49 at each side for receiving the air and a tangential opening or conduit 51 through which the air is discharged. The fan 52 is of the usual construction and is operated from the motor 53 by a belt drive 54, or any other well known driving mechanism.

In order that the fan and motor shall run silently and without transmitting their vibration to the cabinet, suitable cushioning means are provided for supporting the same. As shown in Figs. 3 and 8 a resilient member 55, such as rubber, is provided with a recess for receiving the end of the supporting foot of each of the supporting members 56 of the motor 53. The motor is mounted on a bracket 57 and is held to said bracket by suitable straps 58 extending about the resilient member 55. The bearing 59 at each end of the fan is likewise supported by rubber cushions 61 held in position by sheet metal clamps 62 as clearly shown in Figs. 3, 6 and 7 of the drawings.

In the operation of the device described above, air is caused to flow through the cabinet by means of the fan 52. The air enters through the opening 70 in the upper portion of the cabinet and passes laterally across the conditioning unit 21 between the baffles 38 and transversely to the corrugations. A portion of the foreign matter carried by the air will be collected on the partitions 44 by the baffles 46 due to the centrifugal force of the moving particles. The partitions 44 and 45 and the baffles 46 form receptacles or dust collecting bases for receiving the foreign matter deposited by the air.

After passing into the space at the opposite side of the conditioning unit the air will move downwardly and will be caused to return by the partition 45 through the lower portion of the conditioning unit, and from thence it is drawn axially into the fan from each end thereof, and finally discharged through a conduit 51.

In the form of the device selected to illustrate one embodiment of the invention, means are provided for cooling the baffle plates by means of water and the evaporation thereof. As shown, each of the baffles is covered on its upper side with a sheet of absorbent material 60 of any suitable type such as asbestos. The absorbent material is kept moist or wet in any suitable manner. As shown, a reservoir 64 having discharge conduits 65 is employed for this purpose. The reservoir 64 is adjustably mounted on supports 66 as by means of set screws 67 extending through flanges 68 on said reservoir and engaging said supports. By means of this arrangement the reservoir may be adjusted to such a position that the water will escape through all of the discharge conduits.

A pipe 69 conducts water from a suitable source of supply to said reservoir. The discharge of the water through the pipe 69 is controlled by a valve 71. When the reservoir 64 is properly leveled the water will escape through the conduits 65 from the reservoir and will pass through the tubes 720 on to the upper end of the uppermost baffle plate. By the aid of gravity and capillary attraction the moisture will spread over the entire surface of the sheet 60 on the uppermost plate and will pass through the openings 41 and drip on to the upper end of the asbestos sheet on the next baffle plate below, and so on back and forth, keeping the asbestos sheets on each of the baffle plates moist.

The baffle plates being of metal, their temperature will also be lowered by the evaporation of the water from the asbestos sheets, so that these baffles will also attract dust particles to their under-surface. The corrugations will increase the agitation of the air as it flows across the same, whereby all particles of the air will be brought in contact with the plates in order that the dust, dirt and other foreign matter may be brought in intimate contact therewith, and be attracted thereby.

By varying the temperature and amount of the water supplied to the absorbent material on the vanes, the temperature of the air supplied to the building may be controlled within wide limits. This is especially useful when the structure is employed as a cooling device for supplying cool air during the summer months to buildings such as dwellings and public auditoriums of all kinds. It has been found by experiment, for instance, that if the water supplied to the absorbent material be at a temperature of approximately 70° F., and 800 cubic feet of air at a temperature of approximately 115° F. be moved through the device per minute, and the proper adjustment made as to the amount of water supplied, the air and water will emerge from the device at substantially the same temperature, viz. about 77° F. Or, if the absorbent material be supplied with water at 40° F. temperature, and 1790 cubic feet of air per minute at 103° F. temperature be passed through the device, and the proper adjustments made, the air and the water discharged through the pipe 42 from the device will be at about the same temperature, viz about 47° F. or 48° F.

Figures 9, 10, 11, 12:
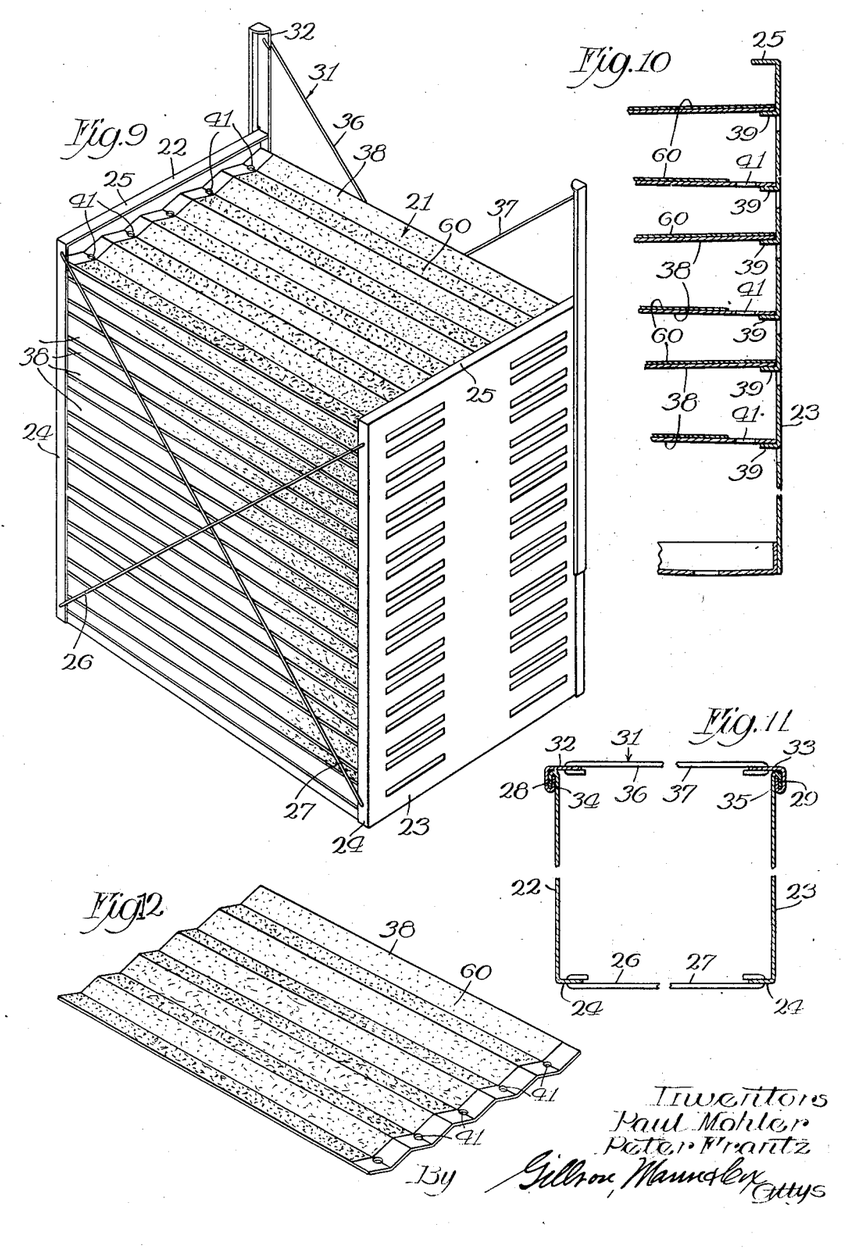
Fig. 9 is a perspective view of the air conditioning unit.
Fig. 10 is a vertical section of a portion of one end thereof.
Fig. 11 is a transverse section of said unit with the baffle plates removed.
Fig. 12 is a perspective view of one of the baffle plates.
Figure 13:
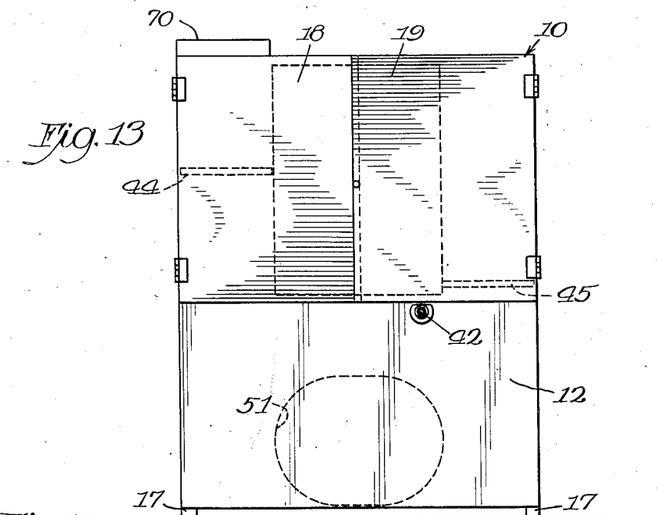
Fig. 13 is a front elevation of the device.

When it is desired to clean the device, the partition members 44 and 45 are first removed by tilting them from the side and removing them through the doors. The air conditioning unit 21 may then be removed by sliding the same forwardly through the doorway. The partitions 44 and 45 and the baffle plates of the unit may be cleaned by flushing with water. If necessary, the posts 32 and 33 may be removed by sliding the same upwardly as shown in Fig. 9, after which the baffles may be slid outwardly if it is desired to clean them separately. Usually, however, it is sufficient to flush the device with water without removing the baffle plates from the unit.

Figures 15, 19:
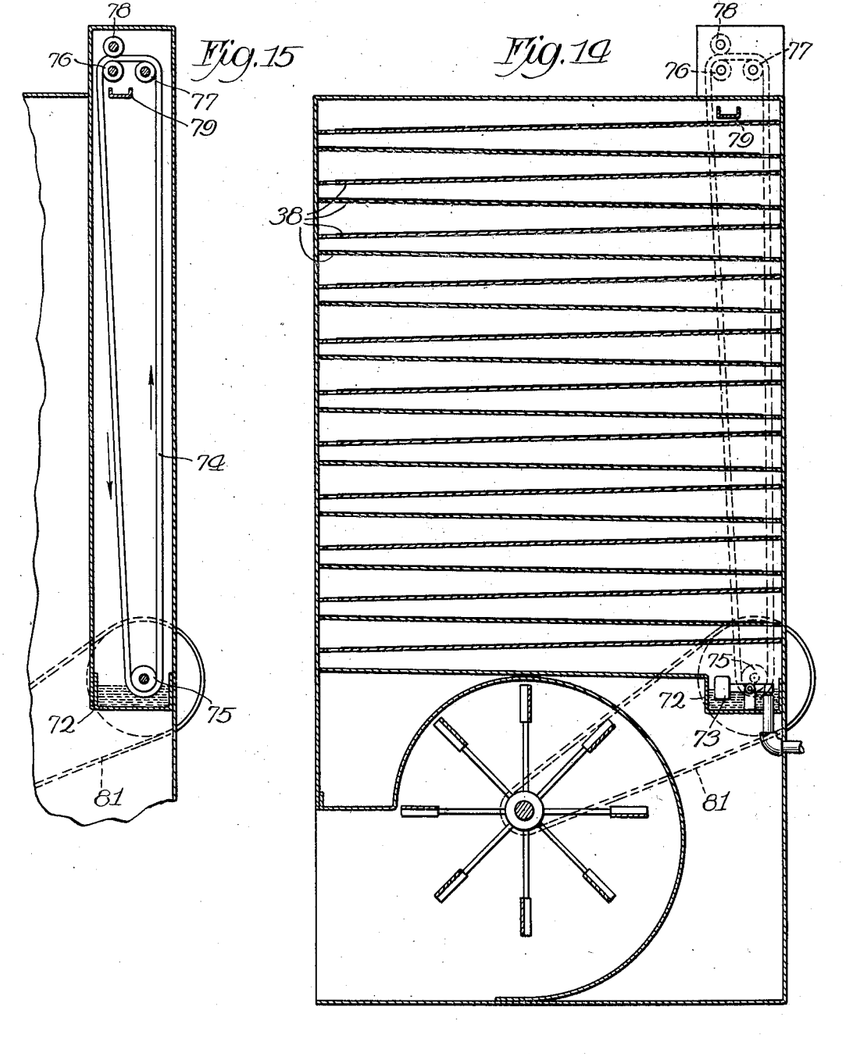
Fig. 15 is a similar view of a portion of the device showing the water elevating mechanism.

A modified form of device for supplying moisture to the asbestos sheets is shown in Figs. 14 and 15. In this form of construction a receptacle 72 is mounted in the lower portion of the cabinet adjacent to the lower end of the lowermost baffle plate, whereby the water dripping from said plate will be collected in said reservoir. A float valve 73 may be provided for maintaining the reservoir at a constant level.

The water is transferred from the reservoir to the uppermost plate by a mechanism that will now be described. A belt 74 of fiber or any other suitable water-absorbing material extends about a roller 75 in said receptacle and over rollers 76 and 77 at the upper end of the unit. A roller 78 is provided opposite the roller 76 for compressing the belt as it passes between the rollers. In operation the belt 74 dips into the water in the receptacle 72 as it passes beneath the roller 75 and the water is pressed out as it passes between the rollers 76 and 78. A trough 79 receives the water and delivers the same on to the uppermost baffle for moistening the same. The roller 75 may be operated from the fan shaft by suitable reducing gearing indicated by the belt drive 81 (see Fig. 15).

In the use of the device suitable conduits are provided for supplying air to the opening 70 and the air may be discharged directly into the building or it may be conveyed a distance by suitable conduits attached to the opening or conduit 51. If desired the cabinet may be placed directly in the room without the use of additional conduits.

Figure 16:
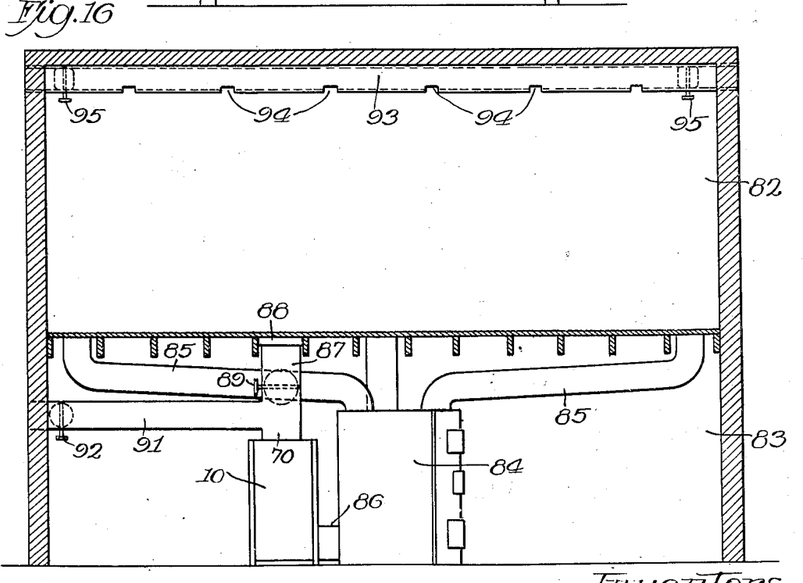
Fig. 16 is a diagrammatic view showing the device installed in a building as a part of an air conditioning system.

In Fig. 16 is shown an air conditioning system more or less diagrammatically. In this view the reference character 82 designates a room of a building and 83 the basement of said building. The heating plant 84 for heating the building is located in the basement 83 and is here shown as being the usual hot air system having the air conduits 85 leading from the jacket of the heating unit. Since the heating plant for the building is of the usual or well known construction it is not thought necessary to further describe or illustrate the same. The cabinet of the air conditioning device is placed adjacent to the air intake of the heating plant and a conduit 86 is provided for connecting the discharge of the air conditioning unit with the air intake of the heating unit. The intake conduit 70 of the cabinet is connected by a suitable passage or conduit 87 with the air return registers 88. The conduit 87 is provided with a damper 89 whereby the amount of air returned can be controlled. The air intake of the air conditioning unit may also be connected to the exterior of the building by a conduit 91 whereby air from the outside may be introduced into the system. The conduit 91 is provided with a valve 92 for controlling the amount of air passing through said conduit. Preferably, though not necessarily, the building is provided with an air discharge conduit 93 located adjacent the ceiling. The conduit 93 is provided with suitable openings 94 through which the heated and foul air of the building may pass into the conduit 93 and escape into the air. The conduit 93 may extend entirely across the building in which event a damper 95 is placed adjacent each wall to control the amount of air passing through said conduit.

It will be noted that in this arrangement moisture is added to the air while the air is in its coolest condition. This is an important feature of the invention because, by means of this arrangement, it is impossible to supersaturate the air as it passes across the moistened plates.

Suitable chemicals may be added to the water that is used for moistening the baffle plates for deodorizing, sterilizing, or perfuming the air passing through said unit.

By means of this arrangement there will always be a circulation of air through the system for supplying clean, pure air to the building, even though the fan be not employed.

In supplying air to buildings, it is necessary that the proper amount of water be supplied with the air otherwise it will have a deleterious effect on the health of the occupants of the building. With the system disclosed, especially in the winter time when the heating plant is in operation, moisture is supplied to the building by the evaporation from the vanes in sufficient quantities, but without excess since the moisture is supplied to the air while it is at its lowest temperature. If desired, in summer, a refrigerating unit may be placed within the cabinet for cooling the air before it is supplied to the building, or if too much moisture is being supplied by the evaporation of the water, a refrigerating unit may be employed for dehydrating the air before it leaves the cabinet.

While, in the system disclosed, a hot air heating system is utilized for distributing and conducting the air to the various portions of the building, it is understood that the system for conducting the air from the air conditioning device to all parts of the building and returning the same, or portions of the same, to said device, may be entirely independent of the heating plant for said building.

The description and drawings disclose the use of only a single unit, but it is understood that one or any number of units may be employed, depending upon the size of the unit, the size of the building, and the like.

It is thought from the foregoing taken in connection with the accompanying drawings, that the construction and operation of our device will be apparent to those skilled in the art, and that various changes in size, shape, proportion and details of construction may be made without departing from the spirit and scope of the appended claims.

We claim as our invention:

1. In an air conditioning device, an inclosure, corrugated baffle plates secured to opposite walls of said inclosure and extending inwardly and downwardly in overlapping relation, said corrugations extending longitudinally of said plates, a layer of moisture absorbent material on each plate, partition means for forming a tortuous passage across said corrugations, means for automatically supplying moisture to the uppermost layer of absorbent material, paper sufficient to saturate all of said layers, said partition means providing dust collecting means below and contiguous to each turn of said passage along said plates, and a fan for causing air to flow through said passage across said corrugations and for discharging the same from said inclosure.

CERTIFICATE OF CORRECTION.

Patent No. 1,898,591.  February 21, 1933.

PAUL MOHLER, ET AL.

It is hereby certified that error appears in the printed specification of the above numbered patent requiring correction as follows: Page 4, line 123, claim 1, strike out the word "paper"; and that the said Letters Patent should be read with this correction therein that the same may conform to the record of the case in the Patent Office.

Signed and sealed this 25th day of April, A. D. 1933.

(Seal)

M. J. Moore,
Acting Commissioner of Patents.